US008756233B2

(12) United States Patent
AbdAlmageed et al.

(10) Patent No.: US 8,756,233 B2
(45) Date of Patent: Jun. 17, 2014

(54) SEMANTIC SEGMENTATION AND TAGGING ENGINE (75) Inventors: Wael AbdAlmageed, Columbia, MD (US); Mohamed Hefeeda, Surrey (CA); Bassem Abdelaziz, Ottawa (CA)

(73) Assignee: Video Semantics, Clarksville, MD (US)

( * ) Notice: Subject to any disclaimer, the term of this patent is extended or adjusted under 35 U.S.C. 154(b) by 144 days.

(21) Appl. No.: 13/089,238

(22) Filed: Apr. 18, 2011

(65) Prior Publication Data

US 2011/0258188 A1    Oct. 20, 2011

Related U.S. Application Data (60) Provisional application No. 61/324,812, filed on Apr. 16, 2010.

(51) Int. Cl.
*G06F 17/30* (2006.01)

(52) U.S. Cl.
USPC .......................... 707/738; 707/776; 705/14.41

(58) Field of Classification Search
USPC ...................................................... 707/738
See application file for complete search history.

(56) References Cited

U.S. PATENT DOCUMENTS

2007/0204238 A1* 8/2007 Hua et al. ...................... 715/838
2008/0066136 A1* 3/2008 Dorai et al. ................... 725/135
2008/0124042 A1* 5/2008 Divakaran et al. ............. 386/52

OTHER PUBLICATIONS

J. Becker, D. Kuropka, Topic-based Vector Space Model, 2003.*
M. Steyvers, T. Griffiths, Probabilistic Topic Models, 2007.*
D. Blei, J. Lafferty, "Topic Models," Text Mining: Theory and Applications, 2009.
M. Steyvers, T. Griffiths, "Probabilistic Topic Models," Handbook of Latent Semantic Analysis, 2007.
G. Salton, A. Wong, C.S. Yang, "A vector space model for automatic indexing," Communication of the ACM Nov. 1975, pp. 613-620, vol. 18, No. 11.
J. Becker, D. Kuropka, "Topic-based Vector Space Model," In proceedings of the 6th International Conference on Business Information Systems, Jul. 2003, pp. 7-12.
J. Lin, "Divergence Measures based on the Shannon Entropy," IEEE Transactions on Information Theory, Jan. 1991, pp. 145-151, vol. 37, No. 1.

* cited by examiner

*Primary Examiner* — William Spieler (57) ABSTRACT

In accordance with the embodiments of the present invention, a method and engine for assigning semantic tags to segments within media. The invention receives media and extracts textual information related to the media's content. It processes the textual information and creates a list of topics related to the content. The invention segments the media and intelligently assigns topical tags to the segments. The semantically segmented media data is outputted for storage or analysis.

13 Claims, 5 Drawing Sheets

SEMANTIC SEGMENTATION AND TAGGING ENGINE

STATEMENT REGARDING FEDERALLY SPONSORED RESEARCH OR DEVELOPMENT

A portion of this invention was made using United States Government support under SBIR/STTR Award Number IIP-0912519 awarded by the National Science Foundation (NSF). The United States may have certain rights in this invention.

BACKGROUND OF THE INVENTION

1. Field of Invention

This invention relates generally to an engine for assigning semantic tags to segments of media.

2. Background of the Invention

The amount of accessible information has dramatically increased in the last decade, particularly with regard to media content broadcasted, streamed, or stored digitally. It is often desirable to locate specific portions of media content that are relevant to a particular topic. Locating content pertaining to specific topics is normally accomplished through metadata attached to the media. For example, a digital video file may be associated with a title, subject, and relevant keywords used to identify the video's subject matter.

BRIEF SUMMARY OF THE INVENTION

A method and engine for assigning semantic tags to segments within media are provided. The engine may receive media and extract textual information related to the media's content. The text may be extracted directly from any media content using closed caption text, speech recognition, or other text extraction methods. The engine may also do text translation. Text translation may be done concurrently or in place of text extraction. Text translation would result in an output text of a different language than the input text or audio in the original media file. The engine may detect the boundaries of commercial breaks in media files and may remove the commercial text information to improve semantic segmentation. The engine may process the textual information using stop-word removal (removing popular words that don't have strong semantic indications), stemming (reducing the text words to their roots or stems), named-entity recognition (detecting and classifying classes of text such as people names, geographic locations, or organization names), or any other processing techniques. The engine may create a list of topics related to the content using the extracted text from the media content. The media may be segmented and topical tags may be intelligently assigned to the segments based on the likelihood that a certain semantic is related to a certain media segment. The semantically segmented media data is outputted for storage or analysis.

The semantic media segmentation engine may be used in different systems, including but not limited to online video search, news monitoring, and digital video recorders with search support. One example that will be used here for illustrative purposes is the example of use for online video search purposes. The online video content may undergo text extraction through detection of closed captioning or speech recognition of the video. The online video content may also undergo a text translation phase where the resulting extracted text is of a different language than the original language used in the online video. The online video may undergo commercial detection such that the commercial segments of the video are detected and the text accompanying such segments is removed. The extracted text may then undergo processing methods such as stop-word removal, stemming, named-entity recognition, or other processing mechanisms. The processed text may then undergo topic detection such that the related topics in the text are detected. One embodiment of the invention employs Latent Dirichlet Allocation (LDA) probabilistic models to infer the set of topics covered in the text documents. Each topic consists of multiple terms or words. The distribution of words over topics as well as the distribution of topics over text documents are considered as hidden variables, which LDA estimates using the characteristics of the input text documents. Other methods may also be employed for purposes of topic detection. Segment tagging may then be used to merge consecutive video segments that have similar semantic tags and to expand semantic tags. Merging results in longer video segments that are semantically coherent and the tag expansion operation expands semantic tags in order to improve the likelihood that the semantic tags associated with a segment cover the textual information content in that segment. The semantic segmentation resulting from the engine may then be linked with a search engine or any type of search mechanism that would allow a user to locate segments of the online video based on the words used in a search.

The following description references the several accompanying drawings, which represent different embodiments of the invention. Specific steps and features are numbered consistently across the multiple figures. It is understood that other embodiments may be utilized and that a variety of changes may be applied without departing from the scope of the invention. In no way do the drawings limit the scope of the invention to only the embodiments represented.

DETAILED DESCRIPTION OF THE INVENTION

The following description is set forth to enable one skilled in the art to make and use the invention. The descriptions of specific techniques, methods, and applications are used only as examples. Various modifications to these examples and descriptions would be apparent to one with skill in the art without departing from the scope of the invention. In no way do the examples limit the scope of the invention.

Figure 1:
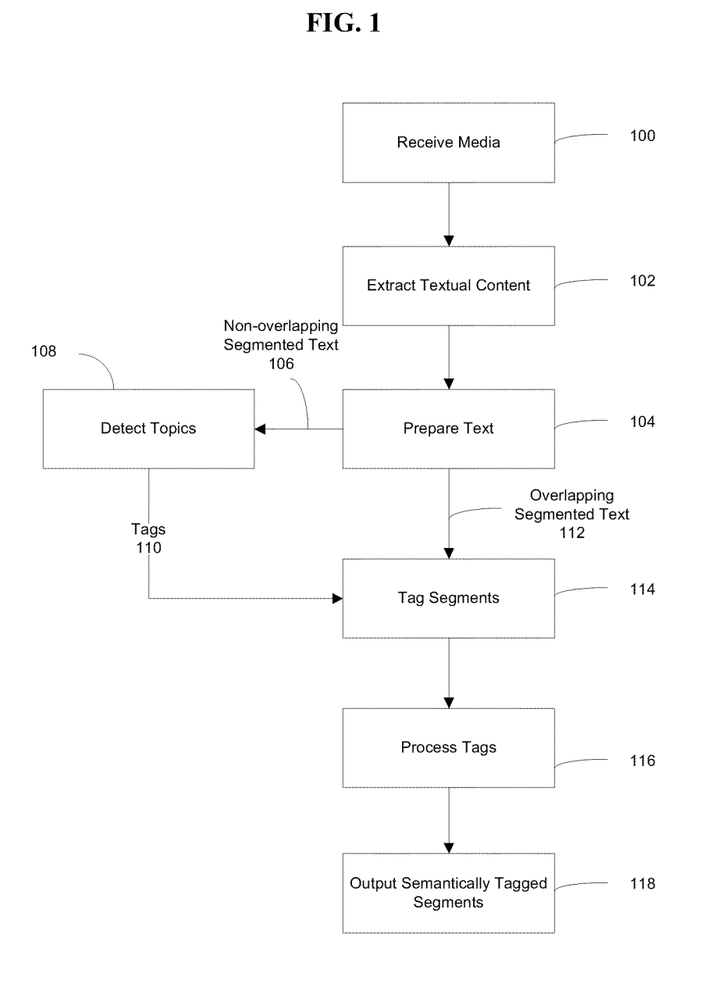
FIG. 1 illustrates an overview of the semantic segmentation process.

FIG. 1 illustrates an overview of the semantic segmentation process. Step 100 receives media from a media source. The term "media" includes, but is not limited to, video, audio, audio-visual content, text, images, slideshows, presentations, signals, data, or combinations thereof. The media may contain a single layer or multiple layers of content. The media may be from a variety sources such as digital files, local databases, online archives, pre-recorded media streams, live media streams, or combinations thereof.

Step 102 obtains or extracts textual content from the media. Several methods may be used to obtain this textual content. These methods include, but are not limited to, extracting closed caption data and using automatic speech recognition. When closed caption data is present, this process may extract the text and time information contained in closed caption data relating to the media. When audio is present in the media, this step may utilize speech recognition systems to convert the audio signals to text along with time information. This step may include a process for translating the extracted text into a different or common language. For example, machine translation allows for processing and storage of semantic information in a native language.

Figure 3:
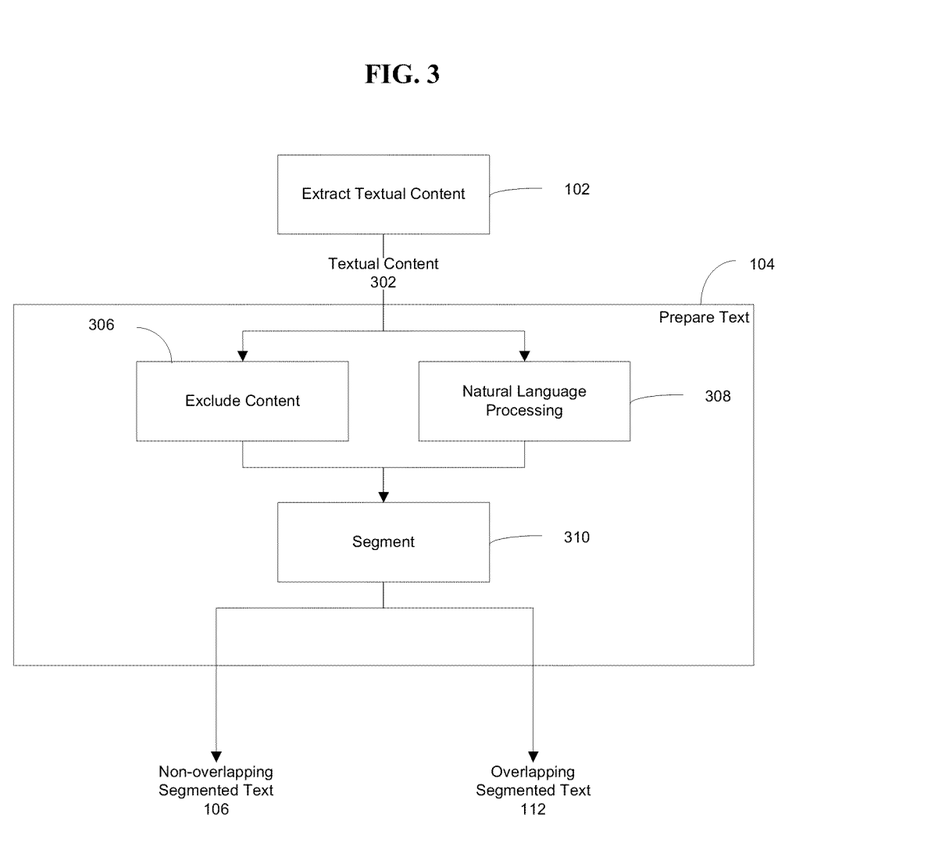
FIG. 3 illustrates the text extraction and preparation steps.

Referring now to FIG. 1 and FIG. 3, step 104 prepares the textual content 302. This preparation step may include determining the time boundaries of content to exclude 306, processing the text using natural language processing methods 308, and dividing the text into segments 310.

It may be desirable to exclude certain portions of the textual content from further processing. In step 306, excluded content can include commercials, unrelated content, or other content that should not be included in further processes. Determining the boundaries of content to exclude from further processing may be important for two reasons. First, it removes the textual information that is not semantically related to the rest of the content. Thus, it reduces the noise in the text used in inferring the semantic tags of the segments. Second, it improves the accuracy of identifying the boundaries of the segments. For example, the start and end of an excluded section may be used to respectively identify the end and start of a semantic segment. The location or timing information of the content to exclude may be provided separately if this information is already known. If the timing information of content to exclude is not known, the process may determine the timing information of commercials and other excluded content. One example implementation of such a process for determining timing information is Comskip, located at http://www.kaashoek.com/comskip/.

The natural language processing step 308 converts textual content into a more useful format. Some of the natural language processing techniques that may be used in this step include, but are not limited to, stopword removal, stemming, named entity recognition, anaphora resolution, and other general natural language processing operations.

The stopword removal process removes frequently used words from the textual content that do not represent strong semantic information. For example, in the English language, words such as "the" and "have" do not carry much semantic meaning and thus can be excluded from further processing. Stopword removal improves the accuracy of the extracted semantic tags.

The stemming process reduces words to their roots such that related words map to the same stem. For example, the stem of "fishing" and "fisher" is "fish." This reduces the complexity and improves the accuracy of extracting the semantic tags from the text.

The named entity recognition process detects and classifies atomic elements in the text into a number of defined classes such as persons' names, geographic locations, and organization names.

The anaphora resolution process resolves pronouns (e.g., he, she, and it) to the actual objects or entities to which they refer in the text. This improves the accuracy of inferring the semantic tags of segments.

The segmenting step 310 divides the text based on its location in the media. For example, a video may be divided into segments based on time. This step uses two segmentation methods. The first method utilizes non-overlapping text segments. For non-overlapping text segments, a moving window of fixed size is used to scan the text and divide it into sequential segments. In general, the end of one segment corresponds to the beginning of another segment. For example, a video's non-overlapping segments may contain a fixed window of one minute of time. The non-overlapping segmented text 312 may be used later for topic detection.

The second segmenting method utilizes overlapping text segments. For overlapping text segments, a moving window is also used, but in general the beginning of one text segment starts before the end of the preceding text segment. The overlapping segmented text 314 may later be used for semantic segment tagging. The overlapping text segments help in identifying the transition in semantic topics across multiple segments.

Referring now to FIG. 1, step 108 detects topics contained in non-overlapping segmented text 106. The step analyzes the incoming textual information in order to detect the semantic topics covered in the media. It generates a set of topics that are covered in the text. These topics are referred to as "tags" 110. Each tag is represented by a set of semantically coherent words that best represent the specific topic. The tags are used to label segments as described in the semantic segment tagging step 114. For example, the tag "baseball" may be associated with the words "pitcher," "batter," "short stop," and "home run." A segment containing some of these words or other related words may indicate that the topic is "baseball." This step may also produce multiple tags from a single segment.

There are several topic modeling techniques that may be used to implement the topic detection step including, but not limited to, Latent Dirichlet Allocation and Probablistic Latent Semantic Analysis. The following publications describe techniques to implement this step, each is incorporated herein by reference as if fully set forth in this description:

D. Blei and J. Lafferty. Topic Models. In A. Srivastava and M. Sahami, editors, Text Mining: Theory and Applications. Taylor and Francis, 2009.

M. Steyvers, T. Griffiths, Probabilistic Topic Models, In Handbook of Latent Semantic Analysis, edited by: T. Landauer, D. Mcnamara, S. Dennis, W. Kintsch. Lawrence Erlbaum Associates 2007.

Figure 4:
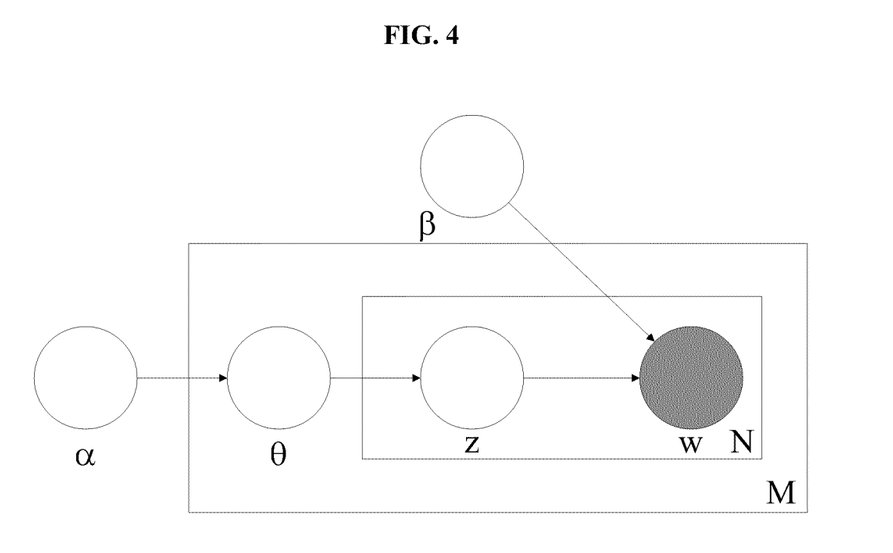
FIG. 4 illustrates a plate model for Latent Dirichlet Allocation, a technique for topic detection.

In one embodiment, the Latent Dirichlet Allocation (LDA) is used. LDA is a method to discover the semantics hidden in a collection of text documents. It employs probabilistic models to infer the set of topics covered in the text documents. Each topic consists of multiple terms or words. The distribution of words over topics as well as the distribution of topics over text documents are considered as hidden variables, which LDA estimates using the characteristics of the input text documents. The input text documents in this implementation are the non-overlapping text segments. FIG. 4 illustrates the Plate Model for LDA, where $\alpha$ represents the per-document semantic topic distribution and $\beta$ is the per-topic word distribution, $\theta_i$ is the topic distribution for document i, $z_{ij}$ is the topic for the $j^{th}$ word in document i and $w_{ij}$ is the specific word. Various latent variables of the LDA model are learned using variational inference.

Note that the semantic segmentation process may use some or all of the textual content extracted from the media to detect topics and does not depend on part of speech tagging. Thus, it does not require resolving individual words to nouns, adjectives, etc. This makes the process efficient and flexible in the types of content it can handle. In addition, the topical tags do not need to be supplied by the media or extracted textual content. Rather, this process may utilize other sources for determining topical tags related to the content. For example, a text segment containing the words "batter" and "home run," but not the word "baseball" may still be tagged with "baseball." Thus, topical tags may not be the same as the actual words contained in the text.

Step 114 involves tagging overlapping segmented text. This step assigns semantic tags 110 to segments. It may use the semantic tags generated by the topic detection step 108 and compute for each segment the subset of tags that most likely capture the semantic meaning of the textual content in that segment. Each tag assigned to a segment has a weight relative to other tags. The weight captures the likelihood that the tag semantically models the textual content of the segment.

The semantic tagging is performed on the overlapping text segments 112 generated by the text preparation step 104. The subset of tags and their weights associated with each segment may be computed by different methods including, but not limited to, vector space modeling and Gibbs sampling. The following publications are incorporated by reference herein as if fully described in this description:

G. Salton, A. Wong, C. S. Yang, A vector space model for automatic indexing, Communications of the ACM, volume 18, number 11, pp. 613-620, November 1975.

J. Becker, D. Kuropka, Topic-based Vector Space Model, In Proceedings of the 6th International Conference on Business Information Systems, pp. 7-12, July 2003.

In a vector space model, the textual content of the segment is considered as a document and is represented as a vector of terms or identifiers. The semantic tags generated by the topic detection step are also assumed to be separate documents, and are represented as vectors. Then, a similarity score between the vector representing the textual content of the segment and every vector representing a semantic tag is computed. Then, the tags with the highest scores are selected and their scores are normalized and used as weights. The similarity scores can be computed using several techniques including but not limited to using (i) the cosine between the angles of the vectors, (ii) the term frequency-inverse document frequency, and (iii) the topic-based vector space model.

The Gibbs Sampling method is an iterative method in which sampling techniques are used to approximate the topic distribution in each segment. Topics with high weights are used as the subset of semantic tags that most likely represent this segment.

It is worth noting that the process may perform initial segmentations by location within the media (e.g., time segments) and does not require the detection of the beginning and end of sentences. Thus, the process does not require a formal sentence structure and performs well even when using less formal and less structured text. For example, if the extracted textual content is a translation from one language to another, the proper formal sentence structure may not be present in the translated text. In another example, the textual content may include the words of multiple simultaneous speakers interlaced throughout a single line of text, thus destroying any coherent sentence structure. This process is able to handle these situations in an efficient manner.

Step 116 processes semantic tags by further improving the semantic segmentation. This step may perform segment merging and tag expansion. Other operations and techniques may also be applicable.

Segment merging combines consecutive segments that have common semantic tags. For example, if three consecutive segments contain the tag "baseball," they may be combined into one segment that spans the location of all three segments. However, this stitching or combining may be triggered by the relative weights of the topical tags in each segment and not merely by the presence of common tags. This results in longer segments that are semantically coherent. The merging process may be performed using different methods, including, but not limited to, a similarity metric, the Hidden Markov Model, and heuristic methods.

In the Similarity (or Divergence) Metric method, each segment is initially associated with a tag distribution, in which each tag is given a relative weight. A similarity metric is computed between consecutive segments based on their tag distributions. There are several similarity metrics between probability distributions. One example metric is the symmetric Kullback Leibler (KL) divergence function, which is given as:

$$KL(R, S) = \frac{1}{2}[D(R, Q) + D(Q, R)], \text{ where}$$

$$D(R, Q) = \sum_{i=1}^{N} r_i \log_2 \frac{r_i}{q_i},$$

and pi, qi are the weights of tag i in segments R, Q, respectively.

The following publication is incorporated by reference herein as if fully described in this description:

J. Lin, Divergence Measures based on the Shannon Entropy, IEEE Transactions on Information Theory, Volume 37, Number 1. Pp. 145-151, January 1991.

The Hidden Markov Model (HMM) is designed to model the transition in semantic topics from one segment to another.

Heuristic methods depend on insights derived from the characteristics of the media. For example, consider two long video segments that are labeled with similar semantic tags, but they are separated by a very short segment that was labeled by a different tag. Since in real videos, semantic topics do not typically change abruptly, the three segments may be merged together and labeled with the semantic tags of the long video segments. The heuristic methods may be used separately or in conjunction with the other methods to improve their performance.

The tag expansion process expands semantic tags in order to increase the likelihood that the semantic tags associated with a segment cover the textual information content in that segment. For example, the tag expansion operation may add additional keywords to the tag if they have similar meanings to existing keywords. One possible way to perform this expansion is by using the open-source WordNet ontology located at http://wordnet.princeton.edu.

Step 118 outputs semantically tagged segments. These semantically tagged segments include the textual segments, location information, and topical tags. This output may then be stored. Note that this process does not require outputting full media segments. Thus, it is efficient, requires fewer resources to process, and requires fewer resources to store or analyze the output.

Figure 2:
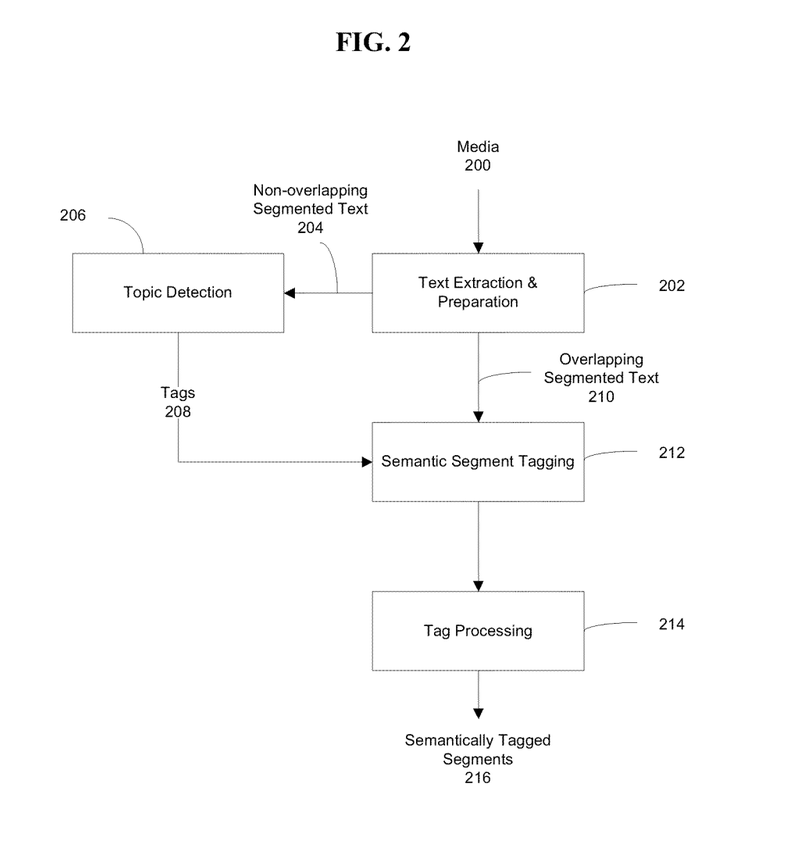
FIG. 2 illustrates an overview of the semantic segmentation process implemented in a semantic segmentation engine.
Figure 5:
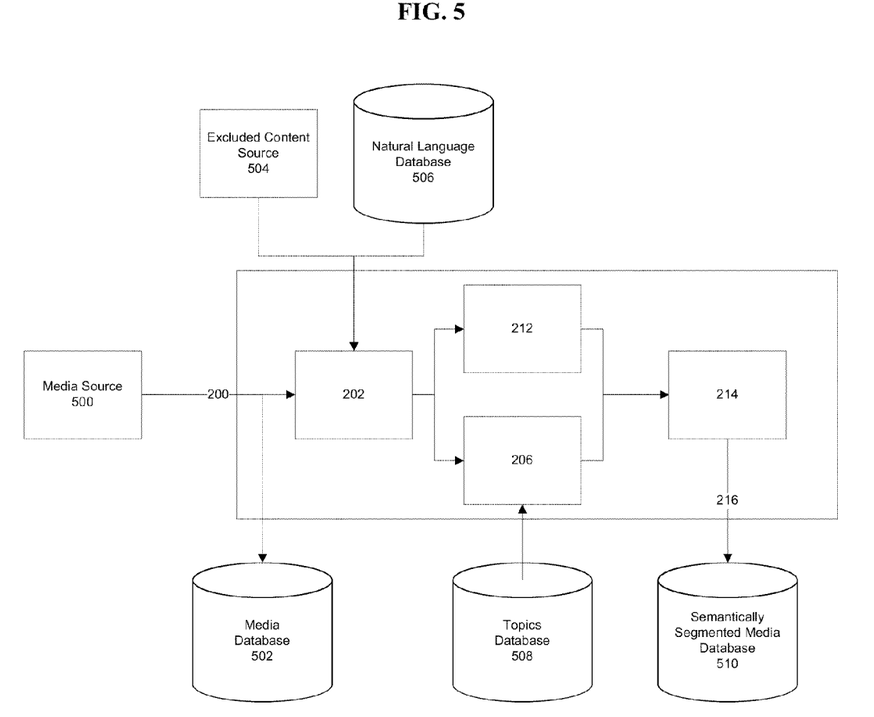
FIG. 5 illustrates a system architecture overview of an implemented semantic segmentation engine.

FIG. 2 illustrates an overview of the semantic segmentation process implemented in a semantic segmentation engine. FIG. 5 illustrates a system architecture overview of an implemented semantic segmentation engine. The engine receives media 200 from a source 500. Media sources may include digital files, local databases, online archives, pre-recorded media streams, and live media streams. The Text Extraction and Preparation Module 202 is responsible for extracting textual content from the media and preparing this textual content for other modules in the engine. It may perform steps 102 and 104 as discussed above.

In some embodiments, it may be useful to store the media before processing it. In other embodiments, a pointer to the location of external media or simply a media identifier may be sufficient. The media and/or pointers may be stored in a media database 502. For example, a live media stream may not be available for later access unless it is stored by the engine. In contrast, an existing media file in an archive may be available for future access, so only the location of the archived file may be stored.

In some embodiments, an excluded content source 504 provides the location(s) within the media to exclude from semantic segmentation in step 306. The location of media content to exclude may be supplied by the media source, another source, or other component, of the segmentation engine such as a speech recognition system as discussed above. For example, a content provider of a television news video may have a record of the timeframes of commercials within the video. The beginning and end of each commercial may be stored in a database for use in the segmentation engine for content exclusion.

In some embodiments, a natural language database 506 may be used to support the natural language processing step 308 described above. The database may include tables containing stopwords, stems, proper names, geographic locations, and organization names, among other data.

The Text Extraction and Preparation Module 202 also segments the text into overlapping segmented text 210 and non-overlapping segmented text 204 segments using step 310 above. For example, a ten-minute video may be segmented into ten one-minute non-overlapping segments (timeframes 00:00-01:00, 01:00-02:00, 02:00-03:00, etc.). In the same example, the video may also be segmented into twenty one-minute overlapping segments (timeframes 00:00-01:00, 00:30-01:30, 01:00-02:00, etc.).

The Topic Detection module 206 may use the non-overlapping segments 204 to determine which topics are present in the segment. This module may use step 108 described above to perform the topic detection and generate topical tags 208.

In some embodiments, the engine may utilize a database ("topics database") 508 of topical tags and the words related to those topics. The topics database may be updated by the engine and may also be updated by other sources. Thus, the engine itself develops more refined and accurate topic tags over time as more media is segmented and tagged. By using this database, topical meanings are greatly enhanced by the cumulative effects of all of these iterations and sources. Therefore, the engine does not have to rely solely on keywords generated from the media currently being processed. Rather, it can pull from other sources to provide more accurate representations of the topics. In addition, as words take on new meanings, new references emerge, and new events occur, the engine can automatically morph the associations between topics and words. For example, a topic on the 2016 presidential election may have different words associated with it as new events take place and new candidates emerge. Further, it may also have new words assigned after the election takes place.

The Semantic Segment Tagging module 212 assigns tags to overlapping segments. This module may use step 114 described above and assign multiple tags to each segment. For example, a segment may be tagged with the topics "baseball" and "Washington, D.C."

In some embodiments a Tag Processing module 214 further refines the semantic segmentation and tagging. It may use the process outlined in step 116 above.

In some embodiments, the bulk of the engine's output 216 is transferred to and stored in the Semantically Segmented Media Database 510. The database may contain records that map topics to semantic segments of media. The database may be queried in order to obtain relevant semantic segments and locate those segments within the specific media.

The abovementioned semantic segmenting engine identifies only a few examples of embodiments. In no way is the engine limited to only the embodiments and examples provided. Certain processes above are identified as being related to certain modules of the engine; however, the modules are in no way limited to only the processes and steps discussed. Certain processes and steps may be performed by different modules than in these examples.

The semantic segmentation engine is applicable to many different systems, including but not limited to online video search, news monitoring, and digital video recorders with search support. The engine is attractive for these types of uses because it does not simply assign broad metadata to an entire media file. Rather it provides the different topics within the media as the topics change through to duration of the media. In addition, the engine does not require human input to assign the topical tags. Thus the engine provides an extremely efficient and accurate solution for locating relevant content within media files or streams.

In one example, an online video search system includes a server computer system connected to client computer systems via a computer network such as the Internet. The server computer system is connected to a video archive system, which is a hardware storage system for storing video files. The video archive system is a media source 500 and a video file is the media 200. This archive can be co-located with the server computer system or it can be remotely located and accessed via a computer network (public or private network). The server computer system runs multiple software systems to index and manage the access to the video archive, to process search queries submitted by users, and to serve (either stream or upload) the relevant video file to users. The segmentation engine is an important component of the server computer system. The segmentation engine performs the semantic segmentation of each video file as described above. It identifies the video segments, not just whole video files, which will most likely match queries submitted by users. These user queries interact with the Semantically Segmented Media Database 510. A user can run a search for a particular keyword or topic and the database search will return the identity of the relevant video file(s) and the relevant segments within those files. Using this engine, the online video search system may: (i) improve the user satisfaction as only relevant video segments are returned to users, which saves the time and effort of users, (ii) save network bandwidth as only the needed (short) video segments are sent to users, and (iii) reduce the processing capacity needed at the server.

In another example, a news monitoring system is used to monitor multiple news channels, which can come from cable networks, satellite feeds, and Internet streaming sites. The system includes hardware components to receive and decode news channels and computer hardware and software to analyze the news channels. The segmentation engine is part of the computer system that analyzes the news channels. The segmentation engine identifies the relevant media segments from all or a subset of the news channels that match search queries or keywords entered by news analysts. Alerts can be sent to analysts when new matching media segments are located. The news channels may be in English or any other language because the segmentation engine may work with any language in its original form. It may also be used on media translated from its original language to another desired language. The translation may either be done manually or using automatic, computer-based, machine translation system.

In yet another example, a DVR system with search support includes hardware and software to receive and store videos from different sources, including cable networks, satellite feeds, and Internet streaming sites. This system also has a video search function in which a user inputs a query and expects to view only the relevant video segments. The segmentation engine may be integrated with the DVR system with search support to identify the beginning and end of the video segments that best match user queries.

What is claimed as new and desired to be protected by Letters Patent of the United States is:

1. A system for creating a database for semantically segmented media, comprising:
a media receiving means for receiving media;
a text extraction and preparation means that extracts textual content from the media and divides the textual content into overlapping text segments and non-overlapping text segments;
a topic detection means for generating a set of topical tags for said non-overlapping text segments by inferring the set of topical tags in said non-overlapping text segments in accordance with a probabilistic model;
a semantic segment tagging means for assigning a topical tag to each overlapping text segment, and for generating a weight for each topical tag assignment;
a tagging processing means for combining said overlapping text segments and non-overlapping text segments based on the topical tag assignment and weight for each overlapping text segment and non-overlapping segment; and
a storage means for storing records that map the topical tag assignments to the overlapping text segments and non-overlapping text segments of the media.

2. The system according to claim 1, wherein the media is received from a media source.

3. The system according to claim 2, wherein the media comprises video, audio, audio-visual content, text, images, slideshows, presentations, signals, data, or combinations thereof.

4. The system according to claim 2, wherein the media source comprises digital files, local databases, online archives, pre-recorded media streams, live media streams, or combinations thereof.

5. The system according to claim 1, wherein the text extraction and preparation means determines the time boundaries of the textual content to exclude and converts the textual content using natural language processing methods.

6. A method for creating a database for semantically segmented media, comprising:
receiving timed media;
extracting textual content from the media;
preparing the extracted textual content by determining the time boundaries of the textual content to exclude, processing the textual content using natural language processing methods, and dividing the textual content into overlapping text segments and non-overlapping text segments;
detecting at least one topic in prepared textual content;
segmenting prepared textual content;
assigning at least one topic to at least one segment of the prepared textual content; and;
storing said prepared textual content and said at least one topic in a database.

7. The method according to claim 6, wherein media is received from a media source.

8. The method according to claim 7, wherein the media comprises video, audio, audio-visual content, text, images, slideshows, presentations, signals, data, or combinations thereof.

9. The method according to claim 7, wherein the media source comprises digital files, local databases, online archives, pre-recorded media streams, live media streams, or combinations thereof.

10. The method according to claim 6, further comprising generating semantic tags by detecting topics contained in said non-overlapping text segments.

11. The method according to claim 6, further comprising assigning the semantic tags to said overlapping text segments.

12. The method according to claim 6, further comprising merging the overlapping text segments and non-overlapping text segments and expanding said semantic tags.

13. The method according to claim 6, further comprising storing in a database records that map the semantic tag assignments to the overlapping text segments and non-overlapping text segments.

* * * * *